(12) United States Patent
Breuninger et al.

(10) Patent No.: US 7,775,552 B2
(45) Date of Patent: Aug. 17, 2010

(54) OCCUPANT RESTRAINT DEVICE FOR A MOTOR VEHICLE

(75) Inventors: Martin Breuninger, Neu-Ulm (DE); Josef Klima, Ulm (DE); Hiroshi Nozu, Hikone (JP)

(73) Assignee: Takata - Petri AG, Aschaffenburg (DE)

( * ) Notice: Subject to any disclaimer, the term of this patent is extended or adjusted under 35 U.S.C. 154(b) by 0 days.

(21) Appl. No.: 12/213,479

(22) Filed: Jun. 19, 2008

(65) Prior Publication Data

US 2009/0008913 A1    Jan. 8, 2009

Related U.S. Application Data

(63) Continuation of application No. PCT/EP2006/012645, filed on Dec. 22, 2006.

(30) Foreign Application Priority Data

Dec. 23, 2005   (DE) .................. 10 2005 062 849

(51) Int. Cl.
*B60R 21/207* (2006.01)
(52) U.S. Cl. ............. 280/730.2; 280/730.1; 297/216.13
(58) Field of Classification Search ............. 280/730.2, 280/730.1; 297/216.13, 216.1
See application file for complete search history.

(56) References Cited

U.S. PATENT DOCUMENTS

| | | | | |
|---|---|---|---|---|
| 5,799,971 | A * | 9/1998 | Asada ................ | 280/730.2 |
| 5,810,389 | A * | 9/1998 | Yamaji et al. ............. | 280/730.2 |
| 5,944,341 | A | 8/1999 | Kimura et al. | |
| 5,988,674 | A * | 11/1999 | Kimura et al. .......... | 280/730.2 |
| 6,155,593 | A * | 12/2000 | Kimura et al. .......... | 280/728.2 |
| 6,450,528 | B1 * | 9/2002 | Suezawa et al. ......... | 280/730.2 |
| 6,959,944 | B2 * | 11/2005 | Mori et al. ............... | 280/728.2 |
| 7,100,992 | B2 * | 9/2006 | Bargheer et al. ......... | 280/730.2 |
| 2005/0218632 | A1 | 10/2005 | Cuevas et al. | |
| 2005/0236819 | A1 * | 10/2005 | Riedel et al. ............. | 280/730.2 |
| 2006/0255572 | A1 * | 11/2006 | Svenbrandt et al. ...... | 280/730.2 |
| 2007/0252368 | A1 | 11/2007 | Balser et al. | |
| 2009/0008914 | A1 * | 1/2009 | Breuninger et al. ...... | 280/730.2 |
| 2009/0014990 | A1 * | 1/2009 | Loibl et al. .............. | 280/730.2 |

FOREIGN PATENT DOCUMENTS

DE    197 48 026 A 1    5/1999

(Continued)

*Primary Examiner*—Paul N Dickson
*Assistant Examiner*—Drew Brown
(74) *Attorney, Agent, or Firm*—Foley and Lardner LLP

(57) ABSTRACT

An occupant restraint device for a vehicle, including a side cheek protruding from a backrest of a vehicle seat. A supporting structure of the vehicle has an outer side facing an exterior space of the vehicle and an inner side facing away from the exterior space of the vehicle and facing the outer side of the side cheek. An airbag arranged in the vehicle seat is supported on the inner side of the supporting structure and exerts an opposing force on the outer side of the side cheek when the airbag is inflated, the force being directed onto the outer side of the side cheek. A pre-crash detection device for identifying an imminent application of force on the outer side of the supporting structure from the exterior space, the pre-crash detection device activating an expansion of the side cheek in an expansion direction along the supporting structure.

26 Claims, 11 Drawing Sheets

FOREIGN PATENT DOCUMENTS

| | | |
|---|---|---|
| DE | 100 43 290 C1 | 4/2002 |
| DE | 10 2005 001 597 A1 | 7/2006 |
| DE | 10 2005 002 464 A1 | 7/2006 |
| EP | 0 470 413 B1 | 3/1995 |
| GB | 2 408 239 A | 5/2005 |
| GB | 2 410 011 A | 7/2005 |
| JP | 09039628 A | 2/1997 |
| WO | WO 01/13767 A1 | 3/2001 |
| WO | WO 01/28819 A1 | 4/2001 |

* cited by examiner

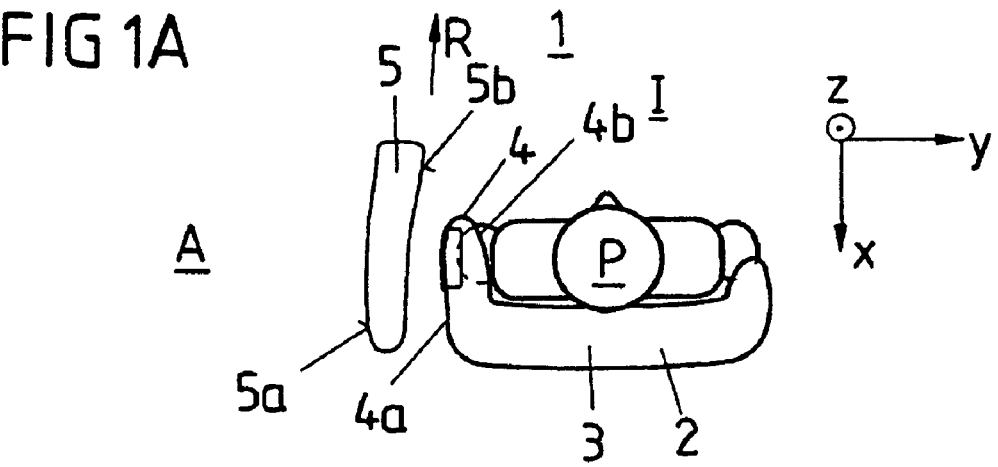
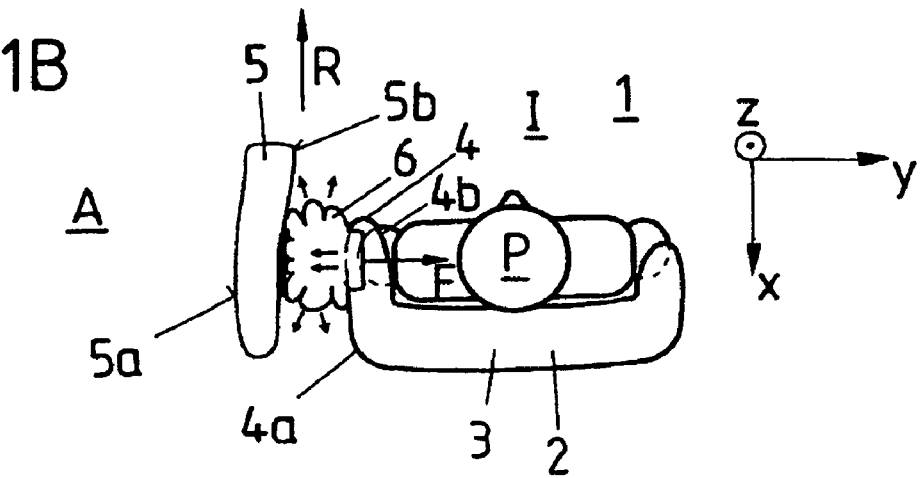
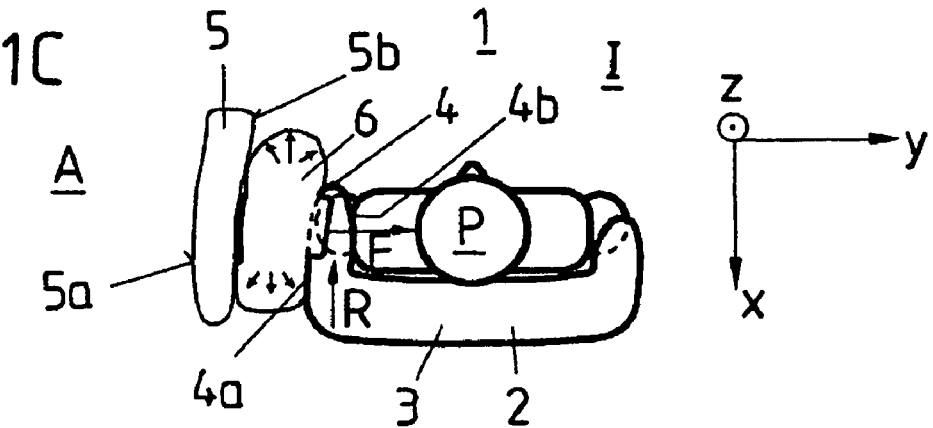

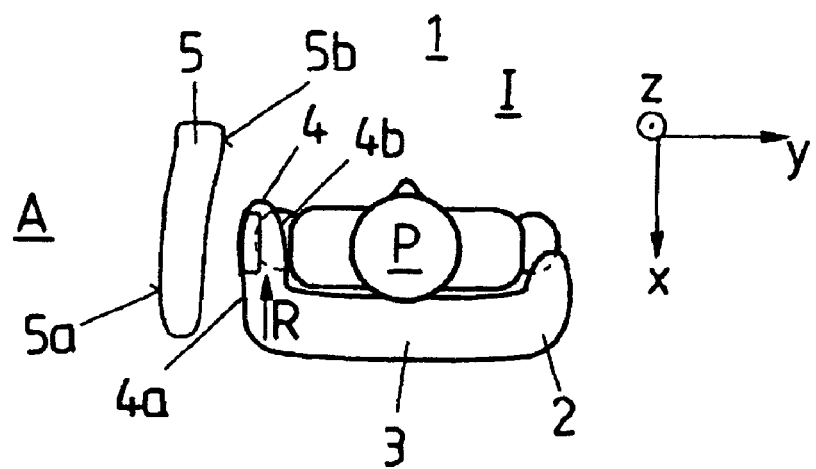
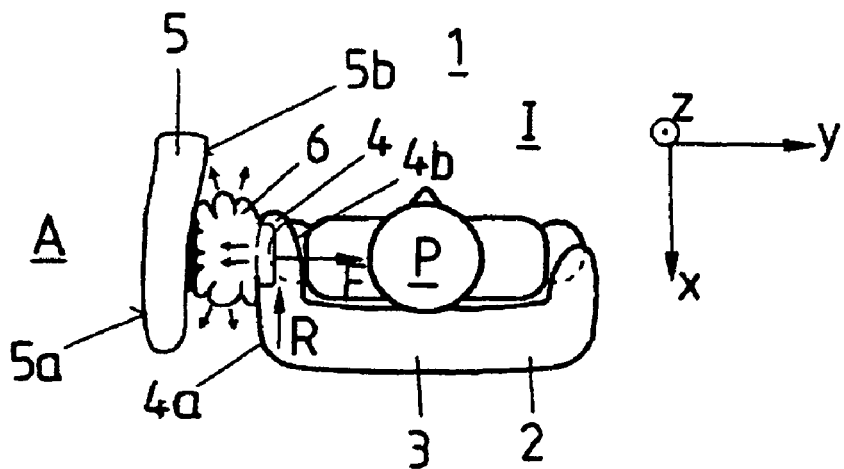
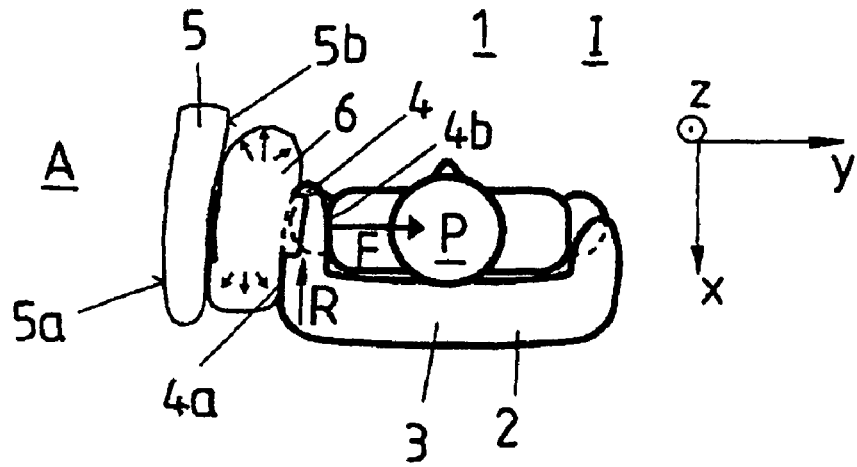

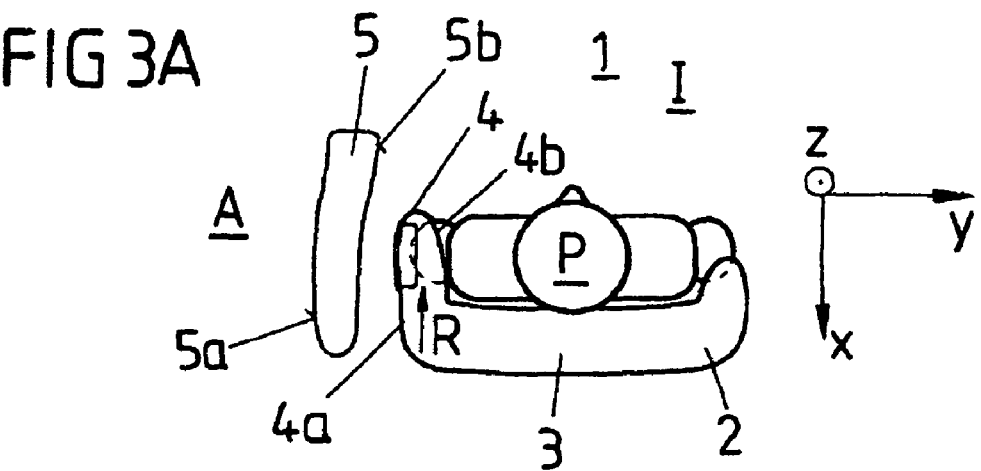
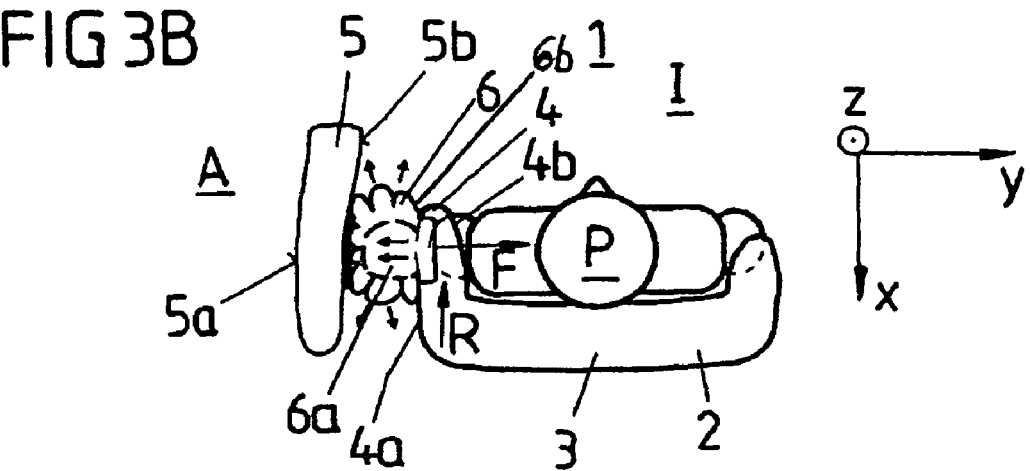
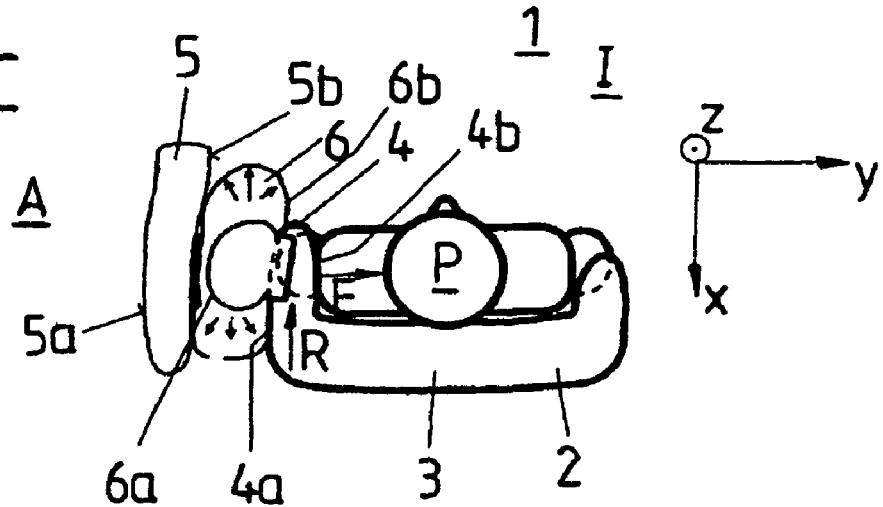

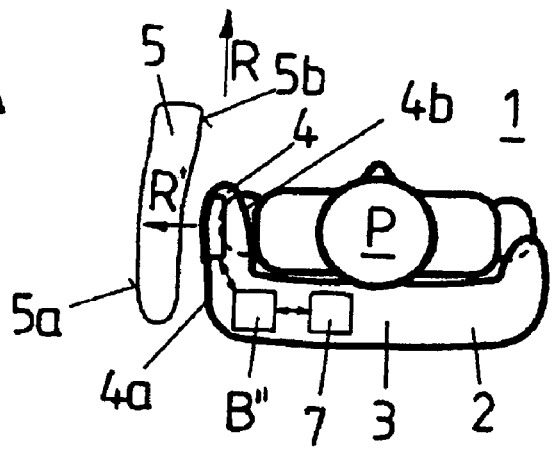
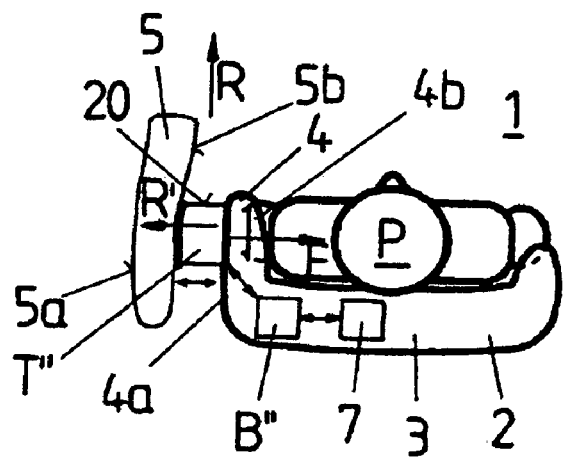
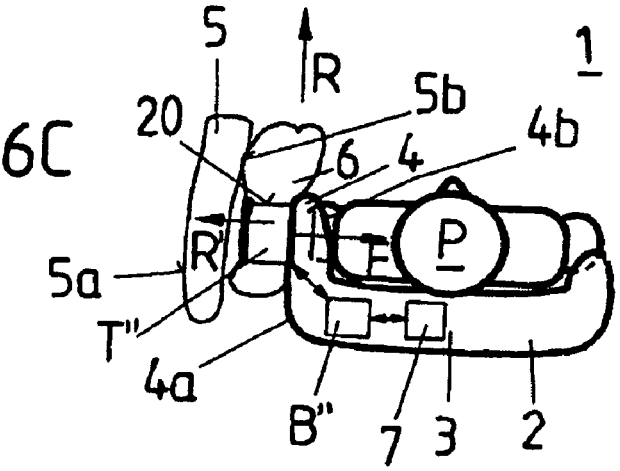

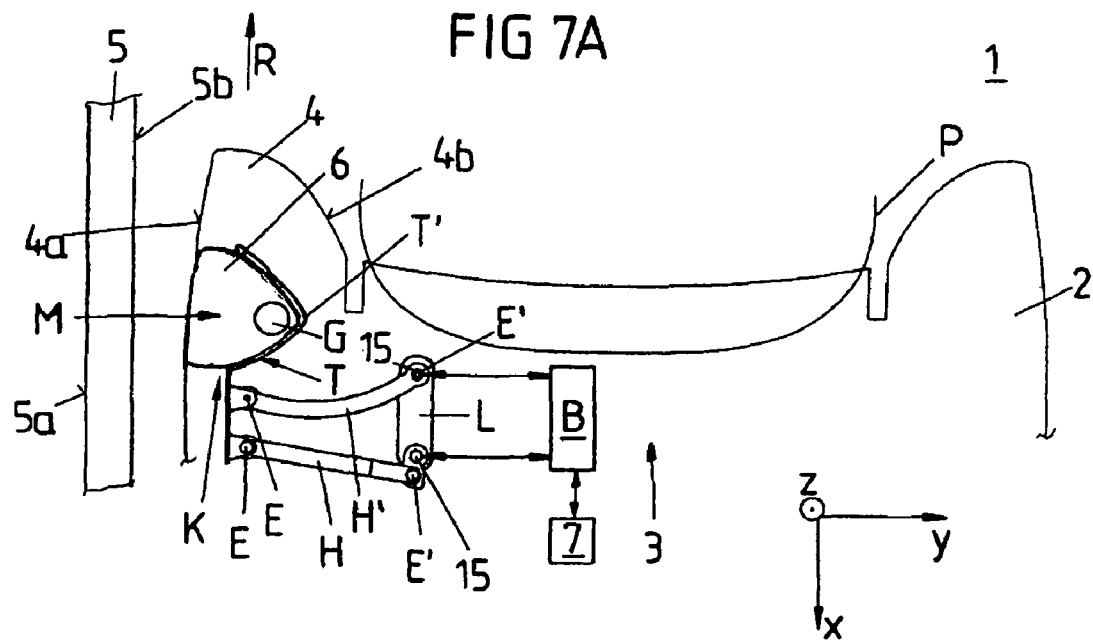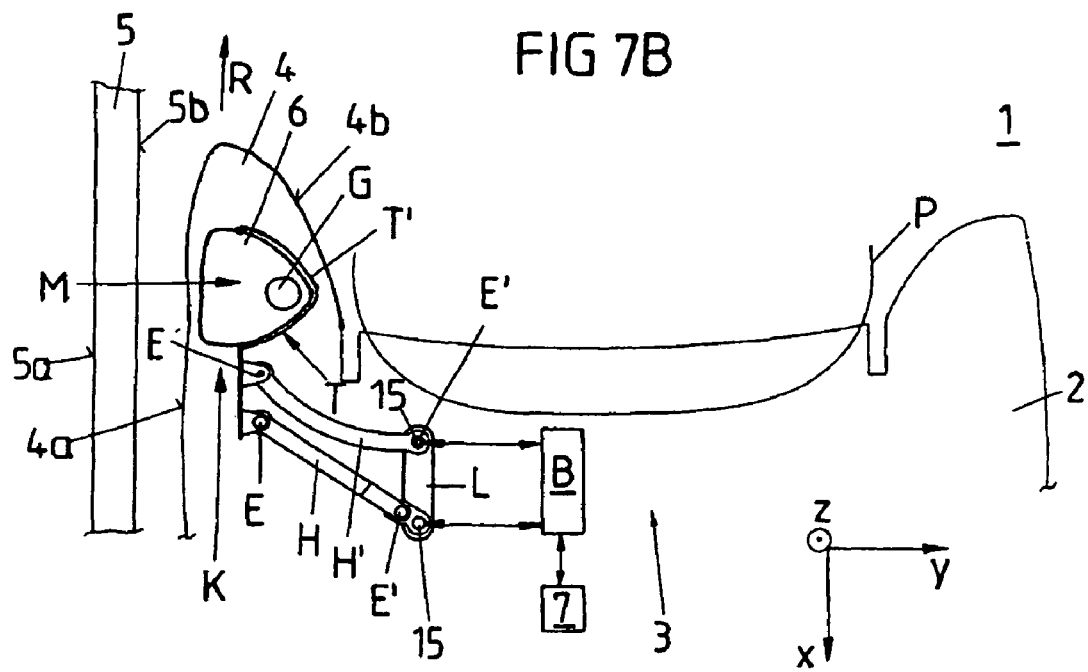

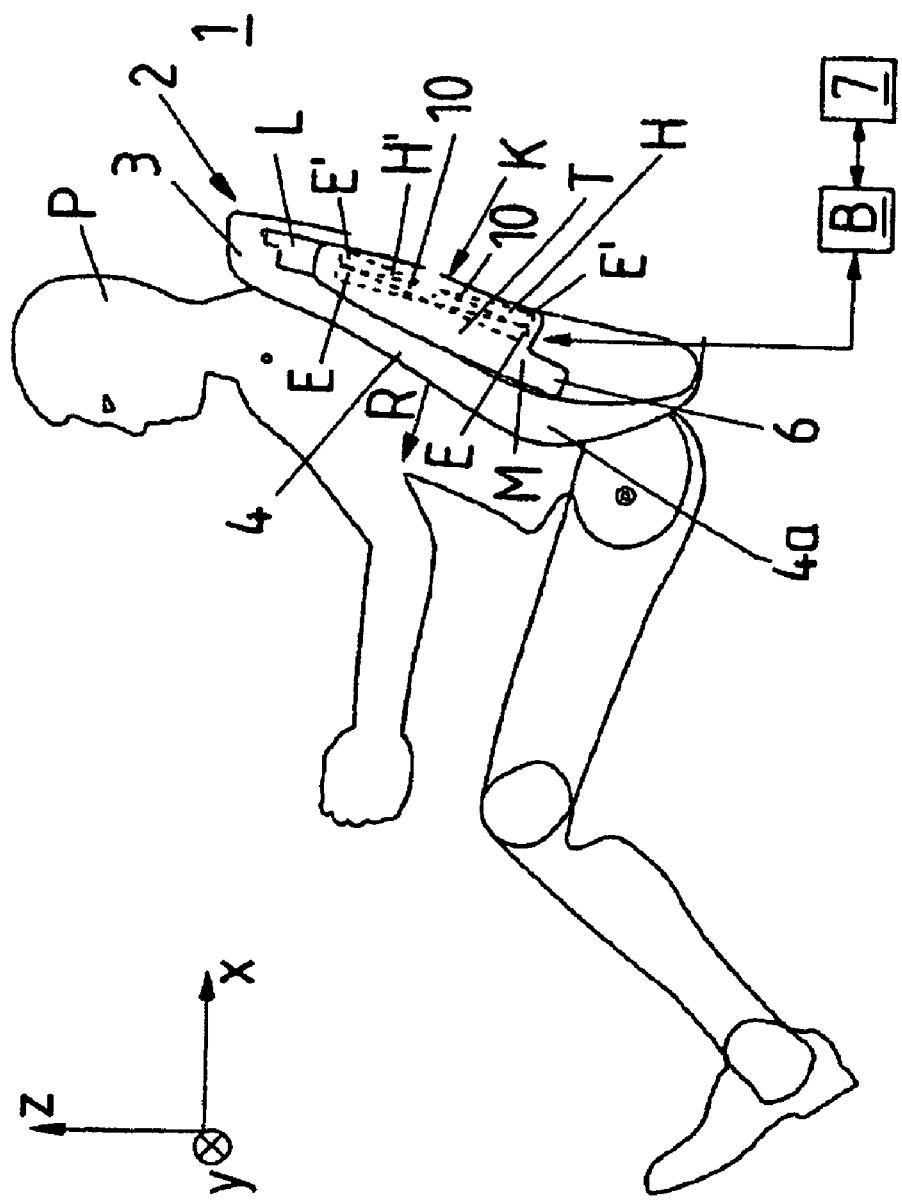

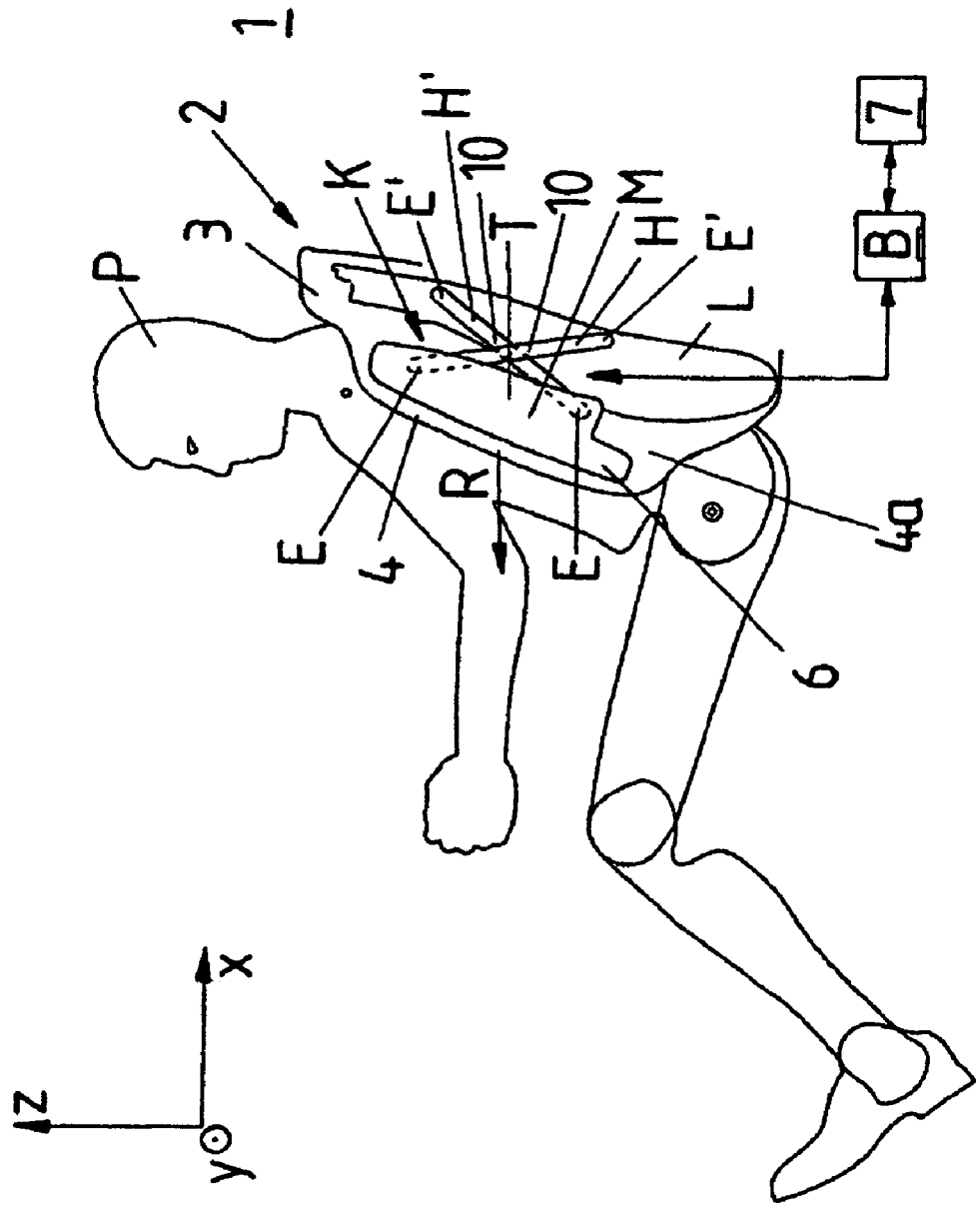

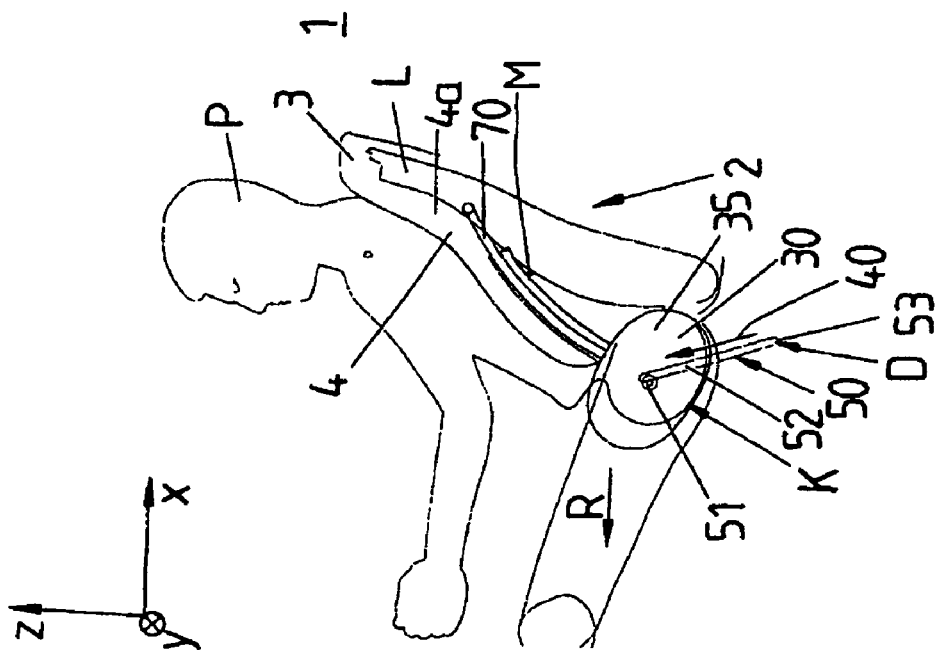
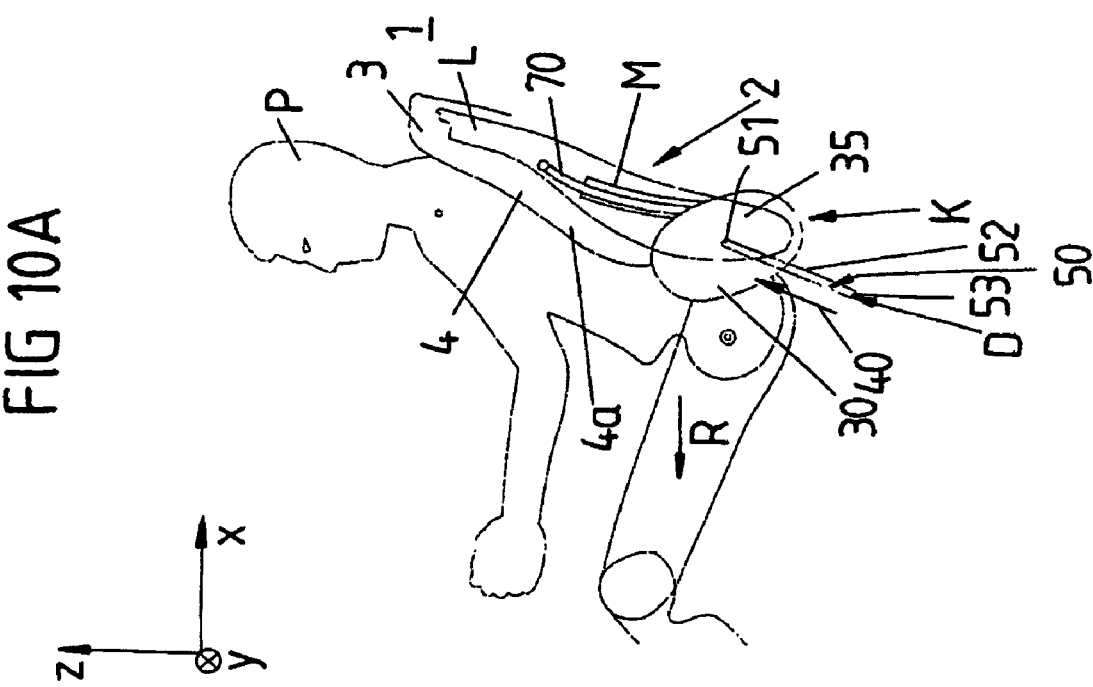

OCCUPANT RESTRAINT DEVICE FOR A MOTOR VEHICLE

CROSS-REFERENCE TO RELATED PATENT APPLICATIONS

This application is a Continuation of International Application PCT/EP2006/012645, filed Dec. 22, 2006, which was published in German as WO 2007/077035. The foregoing document is incorporated by reference herein in its entirety.

BACKGROUND

The present disclosure relates generally to the field of an occupant restraint device for a motor vehicle.

An occupant restraint device conventionally includes a side cheek that extends from the backrest of a motor vehicle seat. The side cheek also includes an outer side that faces away from an occupant occupying the motor vehicle seat. A supporting structure of a motor vehicle includes an inner side that faces the outer side of the side cheek. Additionally, the outer side of the supporting structure faces the exterior space of the motor vehicle and faces away from the inner side. Furthermore, the occupant restraint device includes an airbag arranged on the motor vehicle seat that can be inflated prior to a force being applied to the outer side of the supporting structure from the exterior space, in order to restrain an occupant. In an inflated state, the airbag is supported on the inner side of the supporting structure and exerts an opposing force on the outer side of the side cheek. The opposing force is directed at the outer side of the backrest side cheek from the inner side of the supporting structure.

SUMMARY

One embodiment of the disclosure relates to an occupant restraint device for a motor vehicle including a side cheek protruding from a backrest of a motor vehicle seat. The side cheek laterally supports an occupant correctly occupying the motor vehicle seat and includes an outer side facing away from the occupant. The occupant restraint devices includes a supporting structure of a motor vehicle. The supporting structure includes an outer side facing an exterior space of the motor vehicle and an inner side facing away from the exterior space of the motor vehicle and facing the outer side of the side cheek. An airbag is arranged in the motor vehicle seat. The airbag is inflated to restrain the occupant when a force is applied on the outer side of the supporting structure from an exterior space. The airbag is supported on the inner side of the supporting structure and exerts an opposing force on the outer side of the side cheek when the airbag is inflated. The force is directed onto the outer side of the side cheek from the inner side of the supporting structure. A pre-crash detection device identifies an imminent application of force on the outer side of the supporting structure from the exterior space. The pre-crash detection device activates an expansion of the side cheek in an expansion direction along the supporting structure upon identifying an imminent force.

BRIEF DESCRIPTION OF THE DRAWINGS

The invention will be explained in more detail with reference to the illustrative drawings.

FIGS. 1A-C show an overhead view of an occupant restraint device with a deployable side cheek and an airbag arranged in the side cheek, at three different times after activation of the side cheek, according to an exemplary embodiment.

FIGS. 2A-C show overhead views of an occupant restraint device with a deployable side cheek and an airbag arranged in the side cheek at three different times after activation of the side cheek, according to an exemplary embodiment.

FIGS. 3A-C show overhead views of an occupant restraint device with a deployable side cheek and an airbag with two chambers arranged in the side cheek, at three different times after activation of the side cheek, according to an exemplary embodiment.

FIGS. 6A-C are top views of an occupant restraint device with a deployable side cheek and an airbag arranged in the side cheek at three different times after activation of the side cheek with the airbag being arranged in a housing according to exemplary embodiments.

FIGS. 7A-7B are top views of an occupant restraint device with a deployable side cheek and a side cheek body of the side cheek mounted pivotably on a backrest frame according to an exemplary embodiment.

FIGS. 8A-8B are side views of an occupant restraint device with a deployable side cheek and a side cheek body of the side cheek that is mounted in a linearly displaceable manner on a backrest frame, according to an exemplary embodiment.

FIGS. 10A-10B are side views of an occupant restraint device similar to the type described in FIGS. 9A and 9B, according to an exemplary embodiment.

DETAILED DESCRIPTION

Figure 4A:
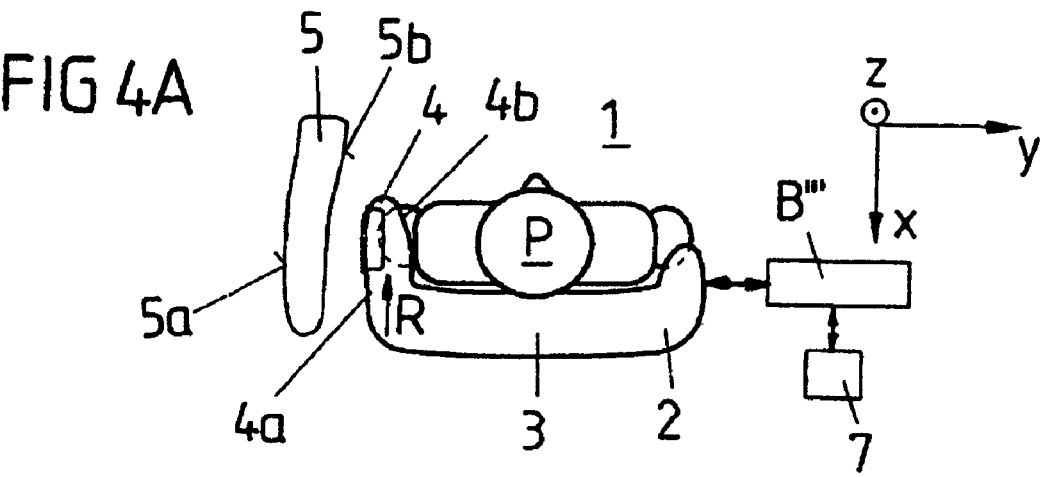
FIGS. 4A-C show overhead views of an occupant restraint device with a deployable side cheek and an airbag arranged in the side cheek at three different times after activation of the side cheek, according to an exemplary embodiment.

According to an exemplary embodiment, an occupant restraint device includes a pre-crash detection device for detecting an imminent application of force to the outer side of the supporting structure from the exterior (for example, a side crash). The pre-crash detection device, upon detecting an imminent application of force, may activate an expansion of the side cheek along an expansion direction running transverse to the backrest.

The side cheek can be expanded transverse to the expansion direction. Additionally, as a result of the expansion along the expansion direction, the side cheek can have a reduced expansion along a direction running transverse to the expansion direction.

The displaceable side cheek improves lateral support of the occupant on the motor vehicle seat, therefore increasing coupling to the motor vehicle seat. Furthermore, the extended side cheek acts as a force mediator and load distributor between the inflated airbag and the occupant.

The airbag may be pre-positioned by the side cheek. Therefore, when fired, the airbag is already near the operative position, permitting rapid deployment and an early effect on the occupant. The ballistic pulse of the deploying airbag (and, if appropriate, of a covering of the airbag) against the side cheek enables the effect brought about by contact between the side cheek and occupant to start. If appropriate, the effect may start before complete filling of the airbag. The airbag may be arranged adjacent to the outer side of the side cheek in the motor vehicle seat.

The planar action of the airbag on the occupant via the load distributor in the form of the expanded side cheek permits the use of high-performance airbags. High-performance airbags may enable more effective occupant restraint.

Due to the pre-crash detection device, the airbag may be fired at an early stage such that the airbag may act on the occupant via the side cheek before the beginning of the intrusion. Therefore, the space between the occupant and supporting structure may be increased. More particularly, the occupant may be pushed away from the supporting structure (e.g. the door structure) by the airbag together with the deforming backrest (side cheek). Thus, effectiveness of the absorption path may be increased and the relative speed at which the occupant may be struck by the intruding supporting structure may be reduced.

The airbag may be fired by a crash sensor designed to sense a crash taking place. For example, by detecting a deceleration or deformation of the motor vehicle by a collision object.

The expandable side cheek may provide the space required for positioning by pushing away soft structures and occupant body parts. Therefore, a sufficiently large deployment space for the airbag module (including an airbag) coupled to the side cheek is ensured.

According to an exemplary embodiment, the side cheek may include a side cheek body that can be moved along the expansion direction between an inoperative position and an operative position. The side cheek body can be covered by an outer covering of the side cheek (for example, foam). The backrest body may be configured to move from an inoperative position into an operative position, thereby transferring the side cheek into an expanded state. At least one (reversibly if appropriate) inflatable body may be included in the side cheek such that the expanded state of the side cheek can be produced or set by inflation of the at least one inflation body.

The backrest of the motor vehicle seat may include a backrest frame as a basic body of the backrest. The side cheek body may be movably mounted on the backrest frame for moving from the inoperative position into the operative position.

According to an exemplary embodiment, the side cheek body may be movably mounted on the backrest frame via a first and second lever. The two levers may be pivotably mounted on the side cheek body via one of their ends. Additionally, the two levers may be pivotably mounted on the backrest frame via the other end, respectively.

The two levers may be fixed to each other such that they can pivot in relation to each other via a central section that connects the two ends integrally to each other. Alternatively, the two levers may be mounted on the backrest frame such that they can pivot about an axis running along the side cheek. Therefore, the side cheek, upon expansion along the expansion direction, may be moved toward an occupant correctly occupying the motor vehicle seat. For example, the side cheek may be moved toward an occupant during movement of the side cheek body from the inoperative position into the operative position.

A movement generating device may generate the movement of the backrest side cheek body. The movement generating device may interact with the pre-crash detection device. The movement generating device may be configured to pivot at least one of the two levers when an imminent application of force to the outer side of the supporting structure is identified. More particularly, the movement generating device may pivot both levers, thereby shifting the side cheek body from the inoperative position into the operative position.

According to an exemplary embodiment, a guide may be provided for the linearly displaceable mounting of the side cheek body on the backrest frame. The guide includes at least one elongated hole, that may be formed on the backrest frame and extend along the expansion direction. A pin may be placed on the side cheek body that may engage the elongated hole such that the pin and therefore the side cheek body can be displaced on the backrest frame along the expansion direction. Thus, the pin and side cheek body may be moved from the inoperative position into the operative position, with the two positions each being assigned a stop of the at least one elongated hole. Additionally, two elongated holes formed parallel to each other on the backrest frame may be provided. Accordingly, two pins then protrude from the side cheek body, the pins being in sliding engagement with a respective elongated hole.

According to an exemplary embodiment, a module support for supporting an airbag package may be included. The module support includes at least the airbag and, if appropriate, a gas generator for inflating the airbag. The module support may be of planar design and may include a border region that extends along the side cheek. Furthermore, the module support may include concave curvature that extends along the side cheek and forms a receptacle for the airbag package.

The module support may be constructed as a rigid housing surrounding the airbag package. When the pre-crash detection device identifies an imminent application of force to the outer side of the supporting structure, the module support may be shifted from a first position into an extended second position along a direction of movement from the outer side of the side cheek to the inner side of the supporting structure.

The housing may include at least one openable region such that the airbag (with the openable region open) can be deployed into an interior of the motor vehicle. When the module support is shifted from the first position into the second position, the openable region may be positioned between the inner side of the supporting structure and the outer side of the side cheek. Therefore, the airbag can be deployed freely (without obstruction) along the direction of expansion between the inner side of the supporting structure and the outer side of the side cheek.

In order to move the module support (housing), a movement generating device that interacts with the pre-crash detection device may be included. The movement generating device is configured to move the module support from the first position into the second position when the pre-crash detection device detects an imminent application of force to the outer side of the supporting structure. The movement generating device can move the module support by electric motor, pneumatically or pyrotechnically.

According to an exemplary embodiment, the side cheek body may include an energy-absorbing cushion or may be designed as an energy-absorbing cushion.

In the operative position of the side cheek body, the cushion may be arranged transverse to the expansion direction between the inner side of the supporting structure and the pelvis of a vehicle occupant correctly occupying the motor vehicle seat.

According to an exemplary embodiment, the cushion may be mounted on the motor vehicle seat such that it can pivot from the inoperative position into the operative position at least via a first arm extending longitudinally along a direction of extent. The first arm may be fixed rigidly via a connecting region to the center of an outer side of the cushion, such that the outer side faces the supporting structure. Additionally, the first arm may be movably mounted the outer side. The connecting region is connected via a central section of the first arm to a bearing region of the first arm, via which the first arm is mounted to a seat part. The seat part is connected to the backrest of the motor vehicle seat such that it can pivot about an axis of rotation. The axis of rotation, with reference to a state of the motor vehicle seat such that it is fitted in a motor vehicle, may be oriented parallel to the transverse axis of the vehicle.

A free first end section of the first arm may protrude along the direction of extent of the first arm from the connecting region. The end section may be connected to the backrest (backrest frame) via a flexible, longitudinally extending side cheek support that, together with the cushion, forms a framework for the side cheek. When the cushion is moved from the inoperative position to the operative position, the side cheek support may then be shifted transverse with respect to its longitudinal extent along the expansion direction. More particularly, the cushion, during movement, carries along the side cheek support.

A free second end section of the first arm may protrude along the direction of extent from the bearing region. Therefore, the first arm may pivot about its axis of rotation such that the backrest body may move from the inoperative position to the operative position. The second end section includes a toothing that, for the aforementioned purpose, may engage a drive wheel. The drive wheel may be driven by a movement generating device that interacts with the pre-crash detection device. The movement generating device is configured and provided in order to drive the drive wheel so as to move the cushion from the inoperative position into the operative position when an imminent application of force to the outer side of the supporting structure is identified.

According to an exemplary embodiment, a longitudinally extending coupling element may replace the toothing. The longitudinally extending coupling element can act on the second end section of the first arm, such that the end section may transmit a linear movement of a movement generating device to the first arm in order to pivot the first arm.

Furthermore, a second arm may be mounted on the cushion via a first free end and may be mounted on the backrest via a second free end. The second arm may assist the movement of the cushion from the inoperative position into the operative position.

According to an exemplary embodiment, the cushion may serve as a support of the gas generator that supplies the gas required for inflating the airbag. The cushion may encase the gas generator and therefore protect the gas generator from damage and protect the occupant from the gas generator.

According to an exemplary embodiment, the airbag package may be fastened to the side cheek support, thereby supporting the module.

When inflated, the airbag may project along the expansion direction beyond the backrest side cheek. Additionally, the inflated airbag may bulge from a front border of the side cheek toward the center of the vehicle. Therefore, the airbag may improve restraint of the occupation, especially in a side collision with a comparatively large frontal component.

According to an exemplary embodiment, the airbag may include a first chamber and a second chamber surrounding the first chamber. The first chamber may include at least one throughflow opening, such that gas introduced into the first chamber can flow into the second chamber. Furthermore, the airbag may be designed to be filled with gas via the first chamber.

Given an appropriate configuration of the overflow cross section (throughflow opening), a high pressure builds up in the inner first chamber before the outer second chamber is filled. Therefore, the airbag can act on the occupant at a relatively early point via the side cheek. If the delivery of gas from the gas generator decreases and/or runs out, then the pressures in the first and the second chambers of the airbag are identical to each other. Thus, only the outer second chamber acts in a planar manner on the occupant via the side cheek.

According to an exemplary embodiment, the motor vehicle seat can be displaced toward the interior parallel to the transverse axis of the vehicle. Additionally, the motor vehicle seat can be rotated about a vehicle axis running parallel to the longitudinal axis of the vehicle. The triggering of a corresponding movement generating device takes place via the pre-crash detection device. As a result of the displacement or rotation of the motor vehicle seat, an additional absorption path is created between an occupant occupying the motor vehicle seat and the supporting structure, thereby permitting effective restraint of the occupant via a correspondingly adapted airbag. The motor vehicle seat may also be passive, i.e. the displacement of the seat takes place by means of the opposing force exerted on the seat by the airbag.

According to an exemplary embodiment, a motor vehicle seat that may deform along the transverse axis of the vehicle may be included. More particularly, the backrest or side cheek of the motor seat is designed to deform in a controlled manner along the transverse axis of the vehicle when the inflating airbag introduces a corresponding opposing force. The corresponding force, that is directed toward the interior of the motor vehicle, may thus be redirected into the motor vehicle seat. Therefore, additional absorption path and/or the maintaining of a deployment space for the airbag between the supporting structure and the motor vehicle seat may be ensured.

A crash sensor that interacts with the gas generator may be included. When an application of force taking place on the outer side of the supporting structure is detected, the crash sensor may activate the gas generator, thereby inflating the airbag. The crash sensor may be a detection device that detects an application of force taking place. The crash sensor may be the pre-crash detection device. The activation of the gas generator by the crash sensor may take place after the adjustment (expansion) of the side cheek or the extension of an airbag housing that can be extended along the transverse axis of the vehicle.

The supporting structure is part or a region of a lateral motor vehicle body, in particular a motor vehicle door or a motor vehicle pillar (e.g. B pillar). The motor vehicle seat may be a driver's seat or a front passenger's seat.

FIG. 7A shows, in conjunction with FIG. 7B, an occupant restraint device 1, with a motor vehicle seat 2. The motor vehicle seat 2 is designed as a driver's seat and includes a backrest 3. The backrest 3, with reference to a state such that it is fitted in a motor vehicle, may be mounted such that it can be pivoted (varied in inclination) about a vehicle axis running parallel to the transverse axis y of the vehicle on a seat part 60 (not shown). The seat part 60 forms a seat surface and extends along a plane of extent that is defined by the longitudinal axis x of the vehicle and the transverse axis y of the vehicle.

The occupant restraint device 1 protects an occupant P occupying the motor vehicle seat 2 against an application of force. More particularly, the application of force takes place from the exterior space A, on the outer side 5a of the supporting structure 5 along a direction that includes at least one component along the transverse axis y of the vehicle. Similar applications of force usually occur in a side crash such that a collision object (for example a motor vehicle) collides with a lateral body, for example the outer side 5a of the supporting structure 5, of the motor vehicle.

The backrest 3 of the motor vehicle seat 2 forms a bearing surface for an occupant P correctly occupying the motor vehicle seat 2. The bearing surface, when the backrest 3 is placed upright, runs along a plane of extent defined by a vehicle axis oriented parallel to the vertical vehicle axis z, and by a vehicle axis extending parallel to the transverse axis y of the vehicle. Side cheeks 4 that, when the backrest 3 is placed upright, run in a longitudinally extending manner along the vertical vehicle axis z, protrude from the backrest 3 on both sides of border regions of the backrest 3. The border regions extend along the backrest 3.

In the motor vehicle seat 3 designed as a driver's seat, one of the two side cheeks 4 is arranged adjacent to a supporting structure 5. The supporting structure may be a (lateral) door structure that may also comprise the B pillar or part of the B pillar.

The side cheek 4 includes an outer side 4a that faces an inner side 5b of the supporting structure 5. The inner side 5b faces the interior I of the motor vehicle, and lies opposite the supporting structure 5 along the transverse axis y of the vehicle, with reference to a state where the supporting structure 5 is integrated in a motor vehicle.

For the pre-positioning of an airbag 6 that is to be inflated between the outer side 4a of the side cheek 4 and the inner side 5b of the supporting structure 5, the side cheek 4 includes a side cheek body K. The side cheek body K is movably fixed on a backrest frame L. The backrest frame L forms a basic framework of the backrest 3, such that the side cheek body K can be shifted from an inoperative position along an expansion direction R into an operative position. As a result, the side cheek 4 expands in the expansion direction R.

The shiftable side cheek body K includes a module support T for an airbag package M that is formed by the airbag 6. A gas generator G enclosed by the airbag 6 is also included. The module support T is formed in a planar manner (for example from a metal sheet) and, in the upright position of the backrest 3, extends along the vertical vehicle axis z. The module support T may include a border region T' that is curved convexly, as viewed from the supporting structure 5. The curvature of the border region T' forms a receptacle for the airbag package M. The receptacle engages at least in sections in cross section around the airbag package M.

For expansion of the side cheek 4, the module support T is mounted pivotably on the backrest frame L via a first lever H and a second lever H'. More particularly, the module support T is mounted about an axis running parallel to the vertical vehicle axis z, with reference to the upright position of the backrest L. Therefore, the module support T, when pivoting from the inoperative position in the direction of the operative position along the expansion direction R, is brought closer along the transverse axis y of the vehicle to the occupant P occupying the motor vehicle seat 2. The expansion direction R runs parallel to the longitudinal axis x of the vehicle. The module support T, the airbag package M, and the levers H, H' are surrounded by a covering (for example a foam) that, together with the covered components, forms the adjustable side cheek 4 of the motor vehicle seat 2.

A pre-crash detection device 7 may be included for identifying an imminent side crash. More particularly, the pre-crash detection device may detect an application of force to the outer side 5a of the supporting structure 5, where the application of force contains a component along the transverse axis y of the vehicle. When such an application of force is identified, a movement generating device B may be triggered. The movement generating device B pivots the side cheek body K into its operative position, such that the side cheek 4 extends along the expansion direction and the inner side 4b of the side cheek 4. The inner side of the side cheek 4 faces away from the outer side 4a of the side cheek 4, forming a bearing surface for the occupant P (see FIG. 2A).

After the side cheek 4 is deployed, a crash sensor 7, upon sensing a crash according to FIG. 2B, fires the gas generator G. As a result, the airbag 6 is inflated. If appropriate, the crash sensor 7 may also be a pre-crash detection device.

When inflated, the airbag 6 is supported on the inner side 5b of the supporting structure 5. Therefore, an opposing force F acts on the side cheek 4. The opposing force F is introduced into the occupant P via the inner side 4b of the side cheek 4. The inner side 4b bears against the occupant P in a planar manner.

FIGS. 2A to 2C show the sequence that is shown in FIGS. 1A to 1C with, in contrast to FIGS. 1A to 1C, the airbag 6 acting on the occupant P via the side cheek 4 before an intrusion of the supporting structure 5. Shown in FIGS. 2A to 2C, a crash sensor 7 in the form of a pre-crash detection device may fire the gas generator G early. Thus, the airbag 6 may be inflated before an intrusion of the supporting structure 5. For example, a collision object striking against the outer side 5a of the supporting structure from the exterior space A may cause an early firing. As a result, the space between the supporting structure 5 (for example the door structure) and the occupant P can be enlarged, thereby protecting the occupant.

In the side cheek actuation sequence shown in FIGS. 3A to 3C, an airbag 6 with two chambers 6a, 6b is used. An inner first chamber 6a, that is arranged within an outer second chamber 6b, is filled with gas. The two chambers 6a, 6b are connected to each other by at least one throughflow opening. Due to the comparatively small volume of the first chamber 6a, the first chamber 6a can be inflated rapidly such that a rapid mechanical coupling of the motor vehicle seat 2 to the supporting structure 5 is possible via the first chamber 6a. The speed that the coupling takes place can be set via the volume and the overflow cross section (size of the throughflow opening) between the first and second chamber 6a, 6b.

Figure 4B:
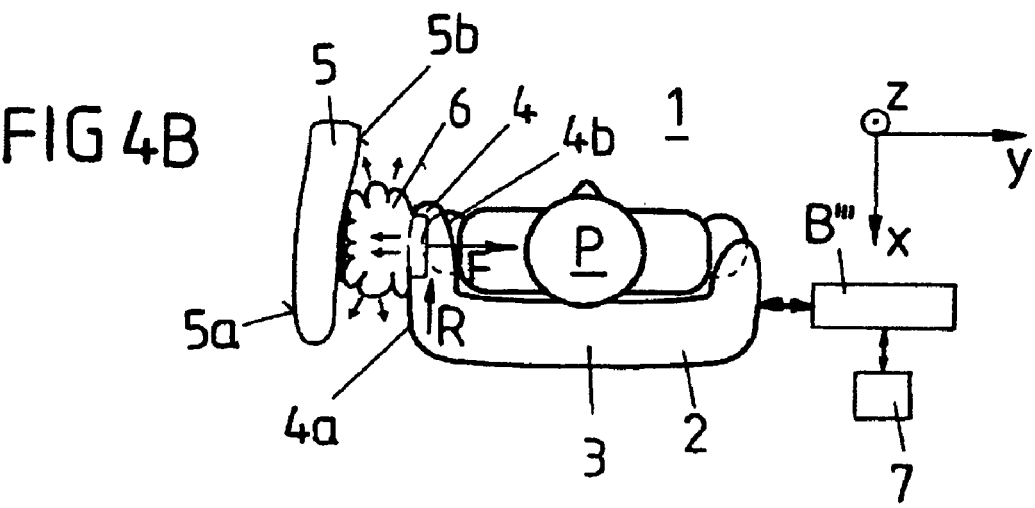
Figure 4C:
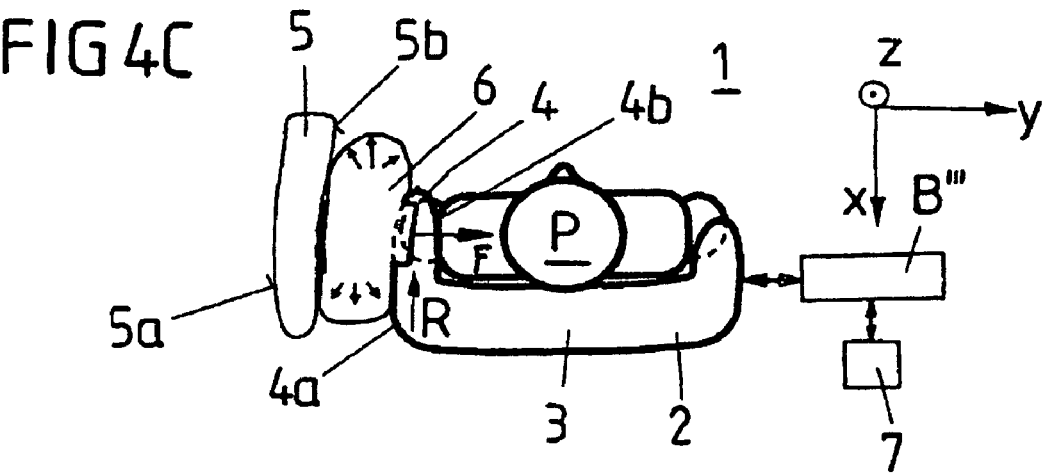

Referring to FIGS. 4A to 4C, the motor vehicle seat 2 may be mounted on the motor vehicle floor such that the motor vehicle seat 2 may be displaced along the transverse axis y of the vehicle. Therefore, the motor vehicle seat 2 can be moved away from the supporting structure 5 by a movement generating device B'''. The activation of the movement generating device B''' takes place via the pre-crash detection device 7. The pre-crash detection device 7 interacts with the movement generating device B''' and activates the movement generating device B''' when a side crash is identified.

Figure 5A:
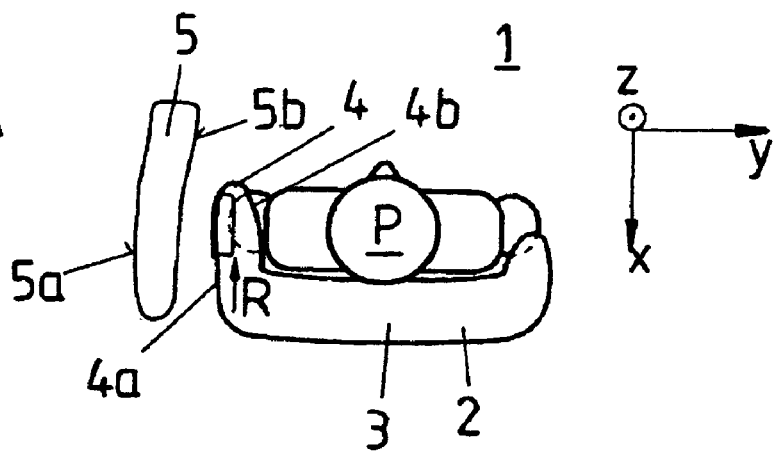
FIGS. 5A-C are top views of an occupant restraint device with a deployable side cheek and an airbag arranged in the side cheek at three different times after activation of the side cheek with the airbag bulging in front of the occupant, according to exemplary embodiments.
Figure 5B:
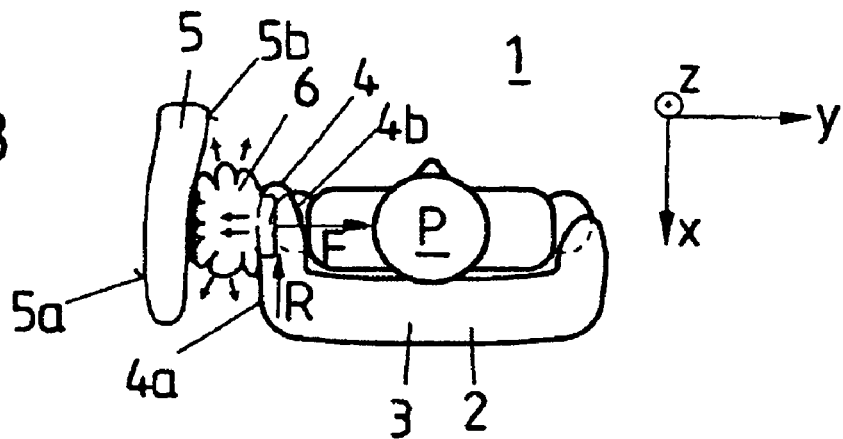
Figure 5C:
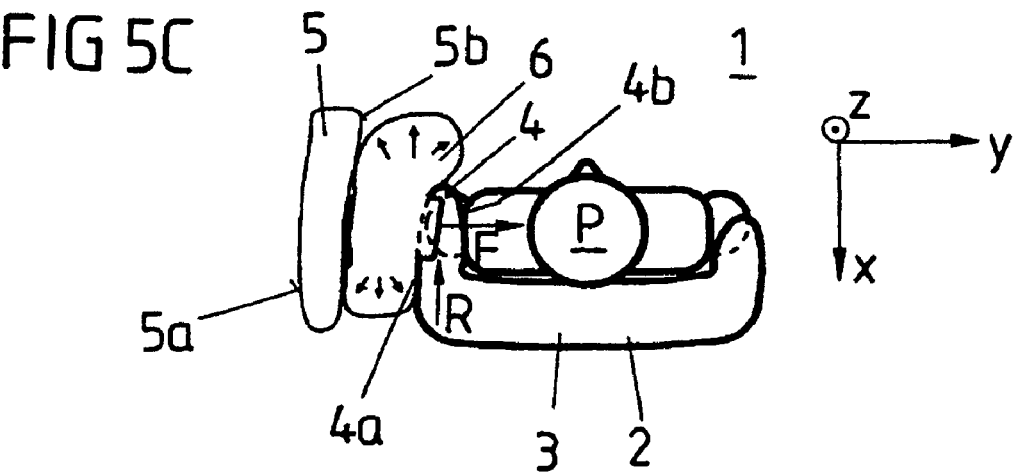

Referring to FIGS. 5A to 5C, the airbag 6 is also designed to, in the inflated state, at least partially push in front of the occupant P along the transverse axis y of the vehicle. Therefore, the protection of the occupant may be increased in the event of a side crash with a large frontal component. More particularly, the protection of the occupant may be increased when the direction of movement of a collision object along the transverse axis y of the vehicle is smaller than that along the longitudinal axis x of the vehicle.

FIGS. 6A to 6C illustrate the course of the activation of the occupant restraint device 1 where the module support T'' is designed as a rigid housing. The module support T'' accommodates the airbag 6 and the gas generator G (not shown). The module support T'' is mounted on the side cheek 4. More particularly, the module support T'' is mounted on the backrest frame L, in a linearly displaceable manner along the transverse axis y of the vehicle such that it may be moved from a first position into a second position. In the first position, the housing T''' is arranged within the backrest side cheek 4 of the motor vehicle seat 2. In the second position, the housing T''' is coupled mechanically to the supporting structure 5. The housing T''' may be coupled by pressing against the inner side 5b of the supporting structure 5 along the transverse axis y of the vehicle. Therefore, an intrusion is opposed. Additionally, there is a blocking of the absorption path between the inner side 5b of the supporting structure 2 and the outer side 4a of the side cheek 4. More particularly, a blocking occurs when a collision object with a movement component along the transverse axis y of the vehicle strikes against the outer side 5a of the supporting structure 5 from the exterior space A. As a result, an occupant P may be protected from an application of force taking place on the outer side 5a of the supporting structure 5 from the exterior space A.

Additionally, the housing T''', when shifted into the second position, may be pressed against the inner side 5b of the supporting structure 5 such that a force is introduced into the motor vehicle seat 2. Therefore, the motor vehicle seat 2 may be displaced along the transverse axis y of the vehicle toward the interior I. Thus, the effective absorption path may be extended, thereby protecting the occupant P.

A bearing side of the housing T''' may be brought to bear against the inner side 5b of the supporting structure 5 upon movement from the first position into the second position. The aforementioned bearing side may be of stable design such that good mechanical coupling to the supporting structure 5 is possible. In the inoperative position, the bearing side may be embedded flush in the outer side 4a of the side cheek 4, such that the outer side faces the supporting structure 5.

Furthermore, a housing T''' may be displaced into the second position (see FIG. 6C). Thus, an openable region 20 of the housing T''' is positioned along the transverse axis y of the vehicle between the supporting structure 5 and the motor vehicle seat 2. When the openable region 20 is in the open state, the airbag 6 can be deployed through the openable region 20 and into the interior I of the motor vehicle. Therefore, the airbag 6 can be deployed without obstruction through the openable region 20, along the longitudinal axis x of the vehicle. Thus, the occupant P is protected against a penetrating collision object.

A movement generating device B''' is coupled to the pre-crash detection device 7 that, upon identifying an imminent side crash, moves the housing T''' into its second position. Therefore, movement of the housing T''' may quickly take place.

FIGS. 8A and 8B show an alternative embodiment of the occupant restraint device 1. According to FIGS. 8A and 8B, the side cheek body K that includes the airbag package M is not mounted on the backrest frame L in a pivotable manner, but rather in a linearly displaceable manner.

Therefore, a first lever H may be pivotably mounted on the backrest body K via one of the two ends E and on the backrest frame L of the motor vehicle seat via the other end. The first lever H may emerge from an upper section (with reference to the vertical vehicle axis z) of the side cheek body K. The bearing point of the lever H on the backrest frame L may be arranged along the vertical vehicle axis z below the bearing point on the side cheek body side.

A second lever H' may be included in order to arrive at a linearly displaceable mounting of the side cheek body K on the backrest frame L. The second lever H' may connect the side cheek body K to the backrest frame L. The second lever H' may be pivotably mounted on a lower section of the side cheek body K at one end E along the vertical vehicle axis z and on the backrest frame L at its other end E'. More particularly, the second lever H' may be mounted above the other end E' of the first lever H. Accordingly, a central section 10 of the first lever H crosses a central section 10 of the second lever H'. The two sections 10 are connected to each other such that they can rotate in relation to each other. The two levers H, H' are pivotably fastened to the side cheek body K, to the backrest frame L and to each other along a pair of axes that run parallel to one another and along the transverse axis y of the vehicle. Therefore, there may be a mounting of the side cheek body K on the backrest frame L. The mounting may be displaceable along the longitudinal axis x of the vehicle (expansion direction R). Furthermore, the two levers H, H' run essentially parallel to each other along the vertical vehicle axis z (see FIG. 8A).

A movement generating device B may enable movement of the side cheek body K from the inoperative position into the operative position. In the operative position, the two levers H, H' are oriented along the longitudinal axis x of the vehicle (see FIG. 8B). The movement generating device B may interact with the pre-crash detection device 7 and can act, for example, on one of the two levers H, H' or directly on the side cheek body K.

Figure 9B:
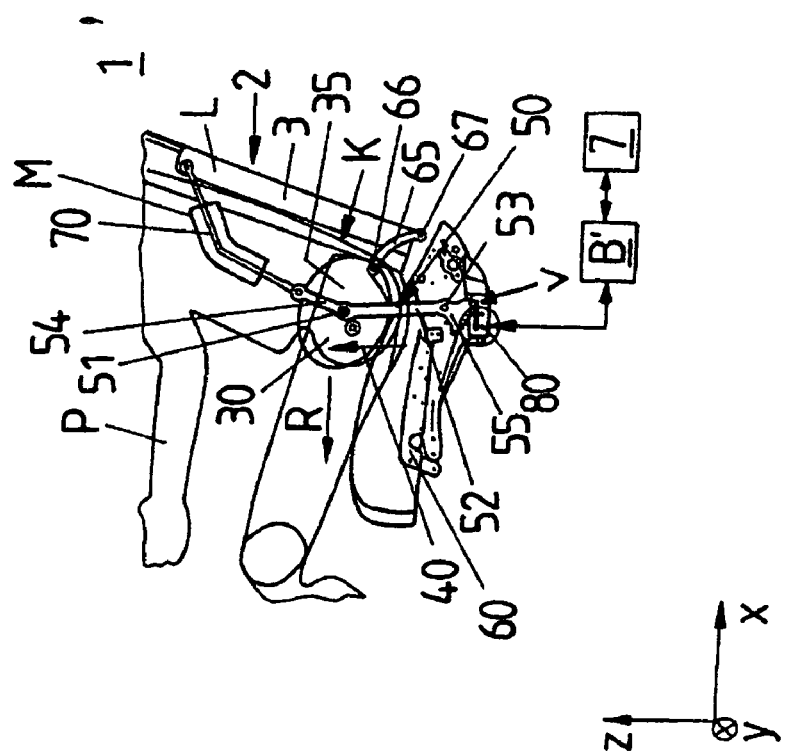
FIG. 9B shows a side view of an occupant restraint device with a deployable side cheek and a side cheek body of the side cheek in an operative position, according to an exemplary embodiment.
Figure 9A:
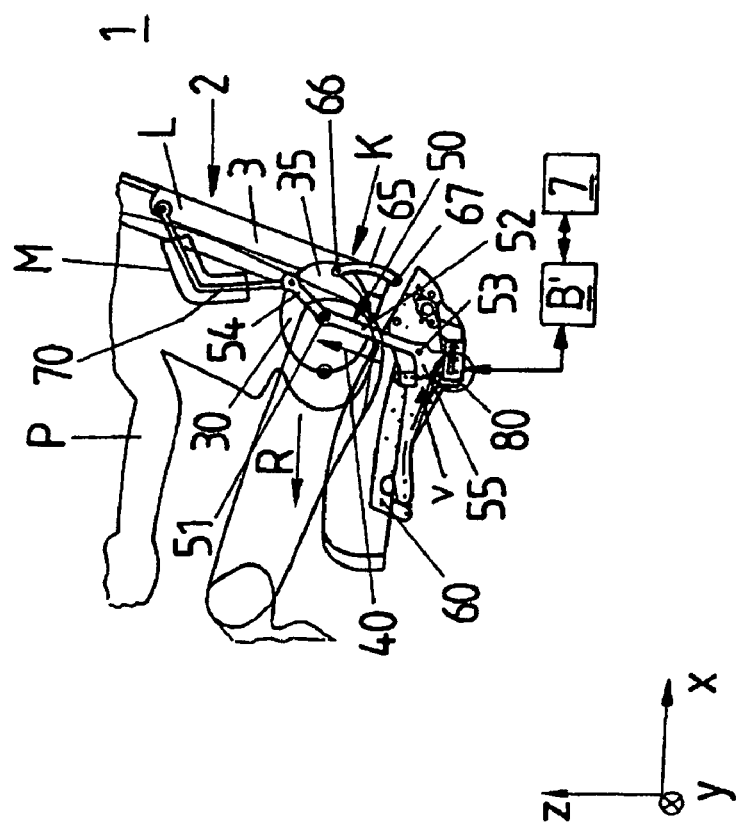
FIG. 9A shows a side view of an occupant restraint device with a deployable side cheek and a side cheek body of the side cheek in an inoperative position, according to an exemplary embodiment.

FIGS. 9A and 9B show an exemplary embodiment of the occupant restraint devices 1 shown in FIGS. 7A to 8B. According to FIGS. 9A and 9B, the side cheek body K is designed as a planar cushion 30 with a round contour. The side cheek body K is mounted on a seat part 60 of the motor vehicle seat 2, thereby allowing expansion of the side cheek 4 (not shown in FIGS. 9A and 9B) that surrounds the cushion 30. The seat part 60 forms a horizontal seat surface about an axis of rotation D that runs parallel to the transverse axis y of the vehicle via a first arm 50 extending along a direction of extent 40. Accordingly, when the first arm 50 pivots in the straight-ahead direction, the cushion 30 may shift along the longitudinal axis x of the vehicle (expansion direction R) such that the backrest side cheek 4 expands along the longitudinal axis x of the vehicle. The cushion 30 may be constructed of an energy-absorbing material, for example a foam. In the operative position, the cushion 30 is arranged along the vertical vehicle axis z and level with the pelvis of an occupant P occupying the motor vehicle seat 2. Thus, the occupant may be protected from penetrating objects.

The first arm 50 may be connected centrally and rigidly via a connecting region 51 to an outer side 35, that faces the inner side 5b of the supporting structure 5, of the cushion. Thus, the first arm 60 may be pivotably mounted to the seat part 60. Furthermore, the connection may also be of a rotatable design such that, during pivoting, the cushion 30 can retain its angular position in space. The connecting region 51 may be connected via a central section 52 of the first arm 50 to a bearing region 53 of the first arm 50, via which the first arm is mounted laterally on the seat part 60. More particularly, the first arm 50 may be mounted a side of the seat part 60 that faces the supporting structure 5, such that the first arm 50 can pivot about the axis of rotation D.

A flexible, longitudinally extending side cheek support 70 may emerge from the connecting region 51. The side cheek support 70 may be connected to the arm 50 or to the connecting region 51 via a free end section 54 of the arm 50. Together with the cushion 30, the side cheek support 70 forms a framework for the side cheek 4. Furthermore, the side cheek support 70 may be connected to the backrest frame L approximately level with the thorax of an occupant P correctly occupying the motor vehicle seat. Therefore, the side cheek support 70 may also serve as a support of the flexible airbag package M. Furthermore, when the cushion 30 shifts along the longitudinal axis x of the vehicle into the operative position, the side cheek support 70 is carried along. Thus, the side cheek support 70 stretches.

The bearing region 53 may be integrally connected to a second free end section 55 of the first arm 50, thereby allowing the first arm 50 to pivot about the axis of rotation D. For pivoting of the first arm 50, the end section 55 may be designed as a toothing that meshes with a drive wheel 80. The drive wheel 80 is driven by a movement generating device B' that interacts with the pre-crash detection device 7. The movement generating device B' is designed to activate the drive wheel 80 in order to move the cushion 30 upon identifying an imminent side crash.

In order to assist the movement of the cushion 30 from the inoperative position into the operative position, a second arm 65 may be included. The second arm 65 may be mounted on a border region of the cushion 30 via a first free end 66, and on the backrest 3. More particularly, the second arm 65 may be mounted on the backrest frame 8, via a second free end 67 lying opposite the first end 66. The second arm 65 is rotatably mounted about an axis running parallel to the transverse axis y of the vehicle.

FIGS. 10A and 10B show an exemplary embodiment of an occupant restraint device 1 similar to the type shown in FIGS. 9A to 9B. In contrast to FIGS. 9A and 9B, an additional second arm 65 is not included. The movement generating device B' and the pre-crash detection device 7 are designed analogously to FIGS. 9A and 9B, but are not illustrated in FIGS. 10A and 10B.

The movement generating devices B, B', B" and B"' used in the present embodiment may operate both reversibly and irreversibly (for example pyrotechnically). In principle, suitable movement generating devices may include springs, gas generators, electric motors and pneumatics.

The solution according to the disclosure allows for increased protection potential by planar introduction of relatively high forces without force peaks into the side cheek or the occupant to be protected, as well as earlier introduction of forces. If appropriate, greater absorption paths for the airbag 6 and greater deployment reliability by the pre-positioning of the airbag 6 may be included. Furthermore, the disclosure allows for better coupling of the occupant P to the motor vehicle seat 2. Additionally, reversibility of the pre-positioning of side cheek 4 and airbag 6 may be included. The occupant restraint device 1 according to the disclosure may be used in all motor vehicles that are equipped with a pre-crash detection device (for example radar).

An occupant restraint device for a motor vehicle is disclosed herein. According to an embodiment, the device includes a side cheek protruding from a backrest of a motor vehicle seat, the side cheek laterally supporting an occupant correctly occupying the motor vehicle seat and having an outer side facing away from the occupant. The device also includes a supporting structure of a motor vehicle that has an outer side facing an exterior space of the motor vehicle and an inner side facing away from the exterior space of the motor vehicle and facing the outer side of the side cheek. An airbag is arranged in the motor vehicle seat, the airbag being inflated to restrain the occupant when a force is applied on the outer side of the supporting structure from an exterior space. The airbag is supported on the inner side of the supporting structure and exerts an opposing force on the outer side of the side cheek when the airbag is inflated, the force being directed onto the outer side of the side cheek from the inner side of the supporting structure. A pre-crash detection device for identifying an imminent application of force on the outer side of the supporting structure from the exterior space is also provided.

The pre-crash detection device activates an expansion of the side cheek in an expansion direction along the supporting structure upon identifying an imminent force.

According to another embodiment, the backrest includes a backrest frame. Also, the side cheek body may be mounted on the backrest frame via a first and a second lever, a first end of each of the first and second levers being pivotably mounted on the side cheek body and a second end of each of the first and second levers being pivotably mounted on the backrest frame. The first and second levers may be fixed to each other in a manner such that they can pivot in relation to each other via a respective central section connecting the second ends to each other. The first and second levers may be each mounted on the backrest frame in a manner such that they can pivot about an axis running along the side cheek. Also, the device may be configured to include a movement generating device that interacts with the pre-crash detection device and pivots at least one of the two levers when an imminent application of force to the outer side of the supporting structure is identified to shift the side cheek body from the inoperative position into the operative position.

According to an alternative embodiment, the occupant restraint device may also include a guide for movably mounting the side cheek body on the backrest frame. The guide may include at least one recess that is formed on the backrest frame and in which a pin formed on the side cheek body engages so the side cheek body can slide along the backrest frame in the expansion direction.

According to an alternative embodiment, the occupant restraint device may include a module support for supporting an airbag package. The module support may be of a planar design and may include a border region extending along the side cheek and having a concave curvature extending along the side cheek and forming a receptacle for the airbag package.

According to an alternative embodiment, the side cheek my surround a side cheek body and the side cheek body may include an energy absorbing cushion. The cushion may be mounted on the motor vehicle seat in a manner such that it can pivot from the inoperative position into the operative position at least via a first arm extending longitudinally along a direction of extent. The first arm may be fixed via a connecting region to an outer side of the cushion facing the supporting structure. The connecting region may be connected via a central section of the first arm to a bearing region of the first arm via which the first arm is mounted on a seat part of the motor vehicle seat in a manner such that it can pivot about an axis of rotation. Furthermore, free second end section of the first arm may protrude along the direction of extent from the bearing region. In addition, the free second end section may include teeth for meshing with a drive wheel to pivot the first arm about the axis of rotation in such a manner that the cushion moves from the inoperative position into the operative position. The free second end section may be connected to a movement generating device via a longitudinally extending coupling element. According to another embodiment, a second arm may be provided. The second arm may be configured to guide the cushion from the inoperative position into the operative position and is mounted on the cushion via a first free end of the second arm and is mounted on the backrest via a second free end of the second arm that is opposite the first free end.

According to an alternative embodiment, the motor vehicle seat may be configured to be mounted in a motor vehicle in a linearly displaceable manner and transverse to the expansion direction so the motor vehicle seat can be displaced from a first position away from the supporting structure into a second position when the pre-crash detection device identifies an imminent application of force to the outer side of the supporting structure. Alternatively, the motor vehicle seat may be configured to be mounted in a motor vehicle in a manner such that it can rotate about a vehicle axis running parallel to a longitudinal axis of the vehicle, the motor vehicle seat capable of being rotated from a first position away from the supporting structure into a second position when the pre-crash detection device identifies an imminent application of force to the outer side of the supporting structure.

The priority application, German Patent Application No. 10 2005 062 849.4, filed Dec. 23, 2005 including the specification, drawings, claims and abstract, is incorporated herein by reference in its entirety.

Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application. The scope of the present application is to be defined as set forth in the following claims.

What is claimed is:

1. An occupant restraint device for a motor vehicle, comprising:
   a side cheek protruding from a backrest of a motor vehicle seat, the side cheek being configured to laterally support an occupant occupying the motor vehicle seat and having an outer side configured to face away from the occupant;
   a supporting structure of a motor vehicle that has an outer side facing an exterior space of the motor vehicle and an inner side facing away from the exterior space of the motor vehicle and facing the outer side of the side cheek;
   an airbag arranged in the motor vehicle seat, the airbag being inflated to restrain the occupant when a force is applied on the outer side of the supporting structure from an exterior space, the airbag being supported on the inner side of the supporting structure and exerts an opposing force on the outer side of the side cheek when the airbag is inflated, the force being directed onto the outer side of the side cheek from the inner side of the supporting structure; and
   a pre-crash detection device for identifying an imminent application of force on the outer side of the supporting structure from the exterior space, the pre-crash detection device activating an expansion of the side cheek in an expansion direction along the supporting structure upon identifying an imminent force such that a main part of the inflated airbag extends between the side cheek and the supporting structure, wherein the inflated airbag bears against both the outer side of the side cheek and the inner side of the supporting structure.

2. The occupant restraint device as claimed in claim 1, wherein by expansion of the backrest side cheek an inner side of the side cheek configured to face the occupant and facing away from the inner side of the supporting structure forms a bearing surface for the occupant via which the opposing force exerted by the airbag can be introduced to the occupant.

3. The occupant restraint device as claimed in claim 1, wherein the side cheek surrounds a side cheek body that can be moved back and forth along and against an expansion direction between an inoperative position and an operative position.

4. The occupant restraint device as claimed in claim 3, wherein the expansion of the side cheek along the expansion direction is brought about by a movement of the side cheek body from the inoperative position into the operative position.

5. The occupant restraint device as claimed in claim 3, wherein the backrest includes a backrest frame, and the side cheek body is mounted on the backrest frame and movable from the inoperative position into the operative position.

6. The occupant restraint device as claimed in claim 3, wherein the side cheek body comprises an energy-absorbing cushion.

7. The occupant restraint device as claimed in claim 6, wherein the cushion is arranged transverse to the expansion direction between the inner side of the supporting structure and a pelvis of a vehicle occupant correctly occupying the motor vehicle seat when the side cheek body is in the operative position.

8. The occupant restraint device as claimed in claim 6, wherein the cushion is mounted on the motor vehicle seat in a manner such that it can pivot from the inoperative position into the operative position at least via a first arm extending longitudinally along a direction of extent, the first arm is fixed via a connecting region to an outer side of the cushion facing the supporting structure, and wherein a first free end section of the first arm protrudes along the direction of extent from the connecting region, the first free end section being connected to the backrest via a flexible and longitudinally extending side cheek support that stiffens the side cheek, the backrest side cheek support being shifted transversely with respect to its longitudinal extent along the expansion direction when the cushion is moved from the inoperative position into the operative position.

9. The occupant restraint device as claimed in claim 8, further comprising:
   a module support for supporting an airbag package that comprises the airbag, the airbag package being fixed to the side cheek support.

10. The occupant restraint device as claimed in claim 6, wherein the cushion is mounted on the motor vehicle seat in a manner such that it can pivot from the inoperative position into the operative position at least via a first arm extending longitudinally along a direction of extent, the first arm is fixed via a connecting region to an outer side of the cushion facing the supporting structure, and wherein a first free end section of the first arm protrudes along the direction of extent from the connecting region, the first free end section being connected to the backrest via a flexible and longitudinally extending side cheek support that stiffens the side cheek, the backrest side cheek support being shifted transversely with respect to its longitudinal extent along the expansion direction when the cushion is moved from the inoperative position into the operative position, and wherein a free second end section of the first arm protrudes along the direction of extent from the bearing region, the free second end section comprises teeth for meshing with a drive wheel to pivot the first arm about the axis of rotation in such a manner that the cushion moves from the inoperative position into the operative position, and wherein a movement generating device interacts with the pre-crash detection device and is configured to drive the drive wheel for moving the cushion from the inoperative position into the operative position when the pre-crash detection device identifies an imminent application of force to the outer side of the supporting structure.

11. The occupant restraint device as claimed in claim 6, wherein the cushion surrounds a gas generator.

12. The occupant restraint device as claimed in claim 1, further comprising:
   a module support for supporting an airbag package that comprises the airbag.

13. The occupant restraint device as claimed in claim 12, further comprising:

a gas generator for inflating the airbag.

14. The occupant restraint device as claimed in claim 13, wherein the airbag package comprises the gas generator.

15. The occupant restraint device as claimed in claim 13, wherein the pre-crash detection device interacts with the gas generator and when a force is detected on the outer side of the supporting structure, the gas generator is activated to inflate the airbag.

16. The occupant restraint device as claimed in claim 12, wherein the side cheek comprises the module support and the airbag package.

17. The occupant restraint device as claimed in claim 12, wherein the module support is a housing that surrounds the airbag package and is configured to move from a first position into a second position along a direction of movement from the outer side of the side cheek to the inner side of the supporting structure if the pre-crash detection device identifies an imminent application of force to the outer side of the supporting structure.

18. The occupant restraint device as claimed in claim 17, wherein the module support has at least one openable region through which the airbag can be deployed into an interior of the motor vehicle.

19. The occupant restraint device as claimed in claim 18, wherein the openable region is positioned between the inner side of the supporting structure and the outer side of the side cheek when the module support is shifted from the first position into the second position so that the airbag can be deployed along the expansion direction between the inner side of the supporting structure and the outer side of the side cheek.

20. The occupant restraint device as claimed in claim 17, wherein a movement generating device interacts with the pre-crash detection device and is configured to move the module support from the first position into the second position when the pre-crash detection device identifies an imminent application of force to the outer side of the supporting structure.

21. The occupant restraint device as claimed in claim 1, wherein the airbag projects along the expansion direction beyond the side cheek when in the inflated state and lays around the side cheek in such a manner that an occupant correctly occupying the motor vehicle seat is at least partially arranged along the expansion direction between the airbag and the backrest.

22. The occupant restraint device as claimed in claim 1, wherein the airbag has a first chamber and a second chamber surrounding the first chamber, the first chamber having at least one throughflow opening through which gas in the first chamber can flow into the second chamber, the airbag capable of being filled with gas via the first chamber.

23. The occupant restraint device as claimed in claim 1, wherein the backrest and/or the side cheek of motor vehicle seat is configured to be deformed transverse to the expansion direction by the opposing force to maintain a deployment space for the airbag.

24. The occupant restraint device as claimed in claim 1, wherein the motor vehicle seat is configured to be mounted in a motor vehicle in a manner such that it can rotate about a vehicle axis running parallel to a longitudinal axis of the vehicle, the motor vehicle seat capable of being rotated from a first position away from the supporting structure into a second position when the pre-crash detection device identifies an imminent application of force to the outer side of the supporting structure, and wherein a movement generating device interacts with the pre-crash detection device and is configured to move the motor vehicle seat from the first position into the second position when the pre-crash detection device identifies an imminent application of force to the outer side of the supporting structure.

25. The occupant restraint device as claimed in claim 1, wherein the airbag in an inflated state is configured to at least partially bear against the occupant occupying the motor vehicle seat to exert an opposing force on the occupant, the opposing force being directed at the occupant from the inner side of the supporting structure.

26. The occupant restraint device as claimed in claim 1, wherein the pre-crash detection device activates the expansion of the side cheek in the expansion direction, wherein the expansion direction extends in a longitudinal direction of the motor vehicle.

* * * * *